(12) United States Patent
Yun et al.

(10) Patent No.: US 10,766,351 B2
(45) Date of Patent: Sep. 8, 2020

(54) SYSTEM AND METHOD OF CONTROLLING REVERSE DRIVING OF HYBRID VEHICLE

(71) Applicants: Hyundai Motor Company, Seoul (KR); Kia Motors Corporation, Seoul (KR)

(72) Inventors: Seok Young Yun, Gyeonggi-Do (KR); Song Il Park, Gyeonggi-do (KR); Tae Young Chung, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 47 days.

(21) Appl. No.: 16/159,873

(22) Filed: Oct. 15, 2018

(65) Prior Publication Data

US 2019/0184810 A1    Jun. 20, 2019

(30) Foreign Application Priority Data

Dec. 18, 2017 (KR) ........................ 10-2017-0173779

(51) Int. Cl.
| | |
|---|---|
| *B60W 20/50* | (2016.01) |
| *B60K 6/547* | (2007.10) |
| *B60K 6/36* | (2007.10) |
| *B60W 20/30* | (2016.01) |
| *B60K 6/387* | (2007.10) |
| *B60W 30/18* | (2012.01) |
| *B60K 6/54* | (2007.10) |

(52) U.S. Cl.
CPC ................ *B60K 6/547* (2013.01); *B60K 6/36* (2013.01); *B60K 6/387* (2013.01); *B60W 20/30* (2013.01); *B60W 20/50* (2013.01); *B60W 30/18036* (2013.01); *B60K 2006/541* (2013.01); *B60W 2510/244* (2013.01)

(58) Field of Classification Search
None
See application file for complete search history.

(56) References Cited

U.S. PATENT DOCUMENTS

| | | | | |
|---|---|---|---|---|
| 2013/0325238 A1* | 12/2013 | Kato | ...................... | B60W 10/06 701/22 |
| 2015/0239452 A1* | 8/2015 | Iwasa | ....................... | B60K 6/48 701/22 |
| 2015/0258983 A1* | 9/2015 | Kimura | .................. | B60K 6/445 701/22 |
| 2018/0162354 A1* | 6/2018 | De Hesselle | ....... | B60W 40/101 |

* cited by examiner

*Primary Examiner* — Justin Holmes
(74) *Attorney, Agent, or Firm* — Mintz Levin Cohn Ferris Glovsky and Popeo, P.C.; Peter F. Corless

(57) ABSTRACT

A method of controlling reverse driving of a hybrid vehicle is provided, in which a reverse gear train of a gear box of a transmission for reverse driving is omitted. When a gear stage enters a reverse stage or is changed from a drive stage to a reverse stage, an engine performs an electric energy charging function on a battery via a hybrid starter generator and a motor transmits driving power for reverse driving to travelling wheels. Accordingly, the battery is charged with electric energy and simultaneously, the motor is reversely driven based on the electric energy supplied from the battery, thereby enabling a hybrid vehicle to be more easily reversed.

16 Claims, 2 Drawing Sheets

SYSTEM AND METHOD OF CONTROLLING REVERSE DRIVING OF HYBRID VEHICLE

CROSS-REFERENCE TO RELATED APPLICATION

This application claims under 35 U.S.C. § 119(a) the benefit of Korean Patent Application No. 10-2017-0173779 filed Dec. 18, 2017, the entire contents of which are incorporated herein by reference.

BACKGROUND

(a) Technical Field

The present disclosure relates to a method of controlling reverse driving of a hybrid vehicle, and more particularly, to a method of controlling reverse driving of a hybrid vehicle, in which a shift to a reverse gear stage is performed by reversely driving a motor while excluding a reverse gear train of a gear box of a transmission for reverse driving.

(b) Background Art

A hybrid vehicle among the environmentally-friendly vehicles is a vehicle which uses an engine and a motor as power sources to promote a decrease in exhaust gas and improvement of fuel efficiency, and a power transmission system is mounted in the hybrid vehicle which separately transmits power of an engine or a motor to vehicle wheels or transmits power of an engine and a motor to the wheels.

For example, as shown in FIG. 1 of the related art, a power transmission system for a hybrid vehicle includes an engine 10 and a motor 12 which are disposed in series, an engine clutch 13 disposed between the engine 10 and the motor 12 and that transmits or blocks power of the engine, an automatic transmission 14 which shifts and outputs power of the motor or power of the motor and the engine to the wheels, a hybrid starter generator (HSG) 16 which is a type of motor connected with a crank pulley of the engine and starts the engine and generates power of a battery, an inverter 18 which operates the motor and adjusts power generation, and a high-voltage battery 20 which is connected with the inverter to be chargeable/dischargeable to provide the motor 12 and the like with power.

A travelling mode of the hybrid vehicle includes an electric vehicle (EV) mode in which the hybrid vehicle travels using power of the motor, and a hybrid electric vehicle (HEV) mode which uses power of the engine as main power and power of the motor as auxiliary power. In the HEV mode, the vehicle travels by a sum of output torque of the engine and the motor simultaneously with lock-up of the engine clutch 13, and in the EV mode, the vehicle travels by output torque of the motor simultaneously with an open of the lockup of the engine clutch 13, and reverse driving is performed by a reverse gear train arranged within a gear box of the automatic transmission 14.

Referring to FIG. 2 of the related art, a dual clutch type is mounted as a type of automatic transmission applied to the hybrid vehicle, and a first-stage, third-stage, and fifth-stage gear train 24-1, a second-stage, fourth-stage, and sixth-stage gear train 24-2, a reverse gear train 24-3, and the like are included in a gear box 24 connected with an output terminal of a dual clutch 22. Accordingly, when driving power of the motor or driving power of the engine and the motor is input to the automatic transmission according to an operation situation and a control strategy of the vehicle, a gear stage is shifted to the drive gear stage and the vehicle travels in the EV mode or the HEV mode.

When a driver shifts a gear stage to a reverse gear stage for reverse driving, forward driving power input to the automatic transmission is converted in a reverse direction and is output by the reverse gear train included in the automatic transmission. In the meantime, the hybrid vehicle adopts a power train in which a motor system is further mounted between an engine and a transmission, unlike an internal-combustion vehicle, so that there is a disadvantage in securing a mounting space of the power train in a package aspect.

Accordingly, to secure the mounting space of the power train, an automatic transmission in which the number of gear stages is decreased may be provided. However, such a configuration causes the fuel efficiency to be degraded. Particularly, in the process of changing a gear stage to the reverse gear stage (R-stage) of the automatic transmission, when a gear stage is the D2 stage at a low speed of a vehicle, a combination of a reverse gear train in which the gear stage enters the D1 stage and then enters the R stage, is required, and thus, a transmission time is excessively long. Similarly, when a gear stage is the D1 stage at a low speed of a vehicle, a combination of a reverse gear train in which a gear stage enters the R stage is required, and thus, a transmission time is excessively long.

The above information disclosed in this section is merely for enhancement of understanding of the background of the invention and therefore it may contain information that does not form the prior art that is already known in this country to a person of ordinary skill in the art.

SUMMARY

The present invention provides a method of controlling reverse driving of a hybrid vehicle, in which a reverse gear train of a gear box of a transmission for reverse driving is excluded, and when a gear stage enters a reverse stage or is changed from a drive stage to a reverse stage, an engine performs an electric energy charging function on a battery via a hybrid starter generator and a motor transmits driving power for reverse driving to travelling wheels, to charge the battery with electric energy and simultaneously, driven the motor reversely based on the electric energy supplied from the battery, thereby enabling a hybrid vehicle to be more easily reversed.

In one aspect, the present invention provides a method of controlling reverse driving of a hybrid vehicle that may include determining, by a transmission controller, whether a gear stage enters a reverse gear stage by an operation of a driver; determining, by the transmission controller, whether an engine clutch has a failure; in response to determining that the engine clutch is in a normal operation state, releasing, by an engine clutch controller, the engine clutch; detecting a state of charge (SOC) of a high-voltage battery using a battery management system; and in response to determining that the SOC of the high-voltage battery is within a normal level in which the SOC is equal to or greater than a threshold value, operating, by a motor controller, a motor to be driven in a reverse direction for reverse driving.

In an exemplary embodiment, the operation of the motor may be maintained so that an engine maintains an off state and the engine clutch maintains a release (open) state. In addition, as a result of the detection of the SOC, in response to determining that the SOC of the high-voltage battery is less than the threshold value, a battery charging control based on the driving of the engine may be performed when an open state of the engine clutch is maintained and simultaneously, the motor may be driven in the reverse direction. Additionally, the battery charging control may be performed by a process, in which an engine controller turns on an engine, a hybrid starter generator connected to a crank shaft of the engine is driven to generate power, and a high-voltage battery is charged based on the power generation of the hybrid starter generator.

In response to determining that the engine clutch has the failure in the open state, the method may proceed to detecting the SOC of the high-voltage battery. In response to determining that the SOC state of the high-voltage battery is within the normal level in which the SOC is equal to or greater than the threshold value, a motor may be driven in the reverse direction, and in response to determining that the SOC of the high-voltage battery is less than the threshold value, a battery charging control according to the driving of an engine may be performed when an open state of the engine clutch is maintained and simultaneously, the motor may be driven in the reverse direction. In addition, in response to determining that the engine clutch has the failure in the close state or that the engine clutch has the failure in the sleep state, the engine may be operated to maintain an off state and simultaneously, the motor may be driven in the reverse direction.

The present invention provides the effects described below.

Firstly, it may be possible to omit a reverse gear train within a transmission for reverse driving, to decrease a size of the transmission and thus secure a mounting space of a power train including the transmission, thereby providing an advantage in a package aspect, and it may be possible to decrease a total weight of a vehicle.

Secondly, an engine charges a battery through a hybrid starter generator (HGS) while reverse driving, and thus, a state of charge (SOC) of a battery may be secured more easily and electric energy more be supplies more easily for reverse driving to a motor.

Thirdly, it may be possible to prevent a phenomenon in which an existing shift to a reverse gear stage for reverse driving, that is, a shift to a reverse gear stage according to a combination of a reverse gear train, is delayed, thereby solving delay of the shift to the reverse gear stage.

Fourthly, friction loss of an existing reverse gear train for reverse driving may be prevented from being generated, thereby promoting improvement of fuel efficiency.

BRIEF DESCRIPTION OF THE DRAWINGS

The above and other features of the present invention will now be described in detail with reference to exemplary embodiments thereof illustrated in the accompanying drawings which are given hereinbelow by way of illustration only, and thus are not limitative of the present invention, and wherein.

Figure 1:
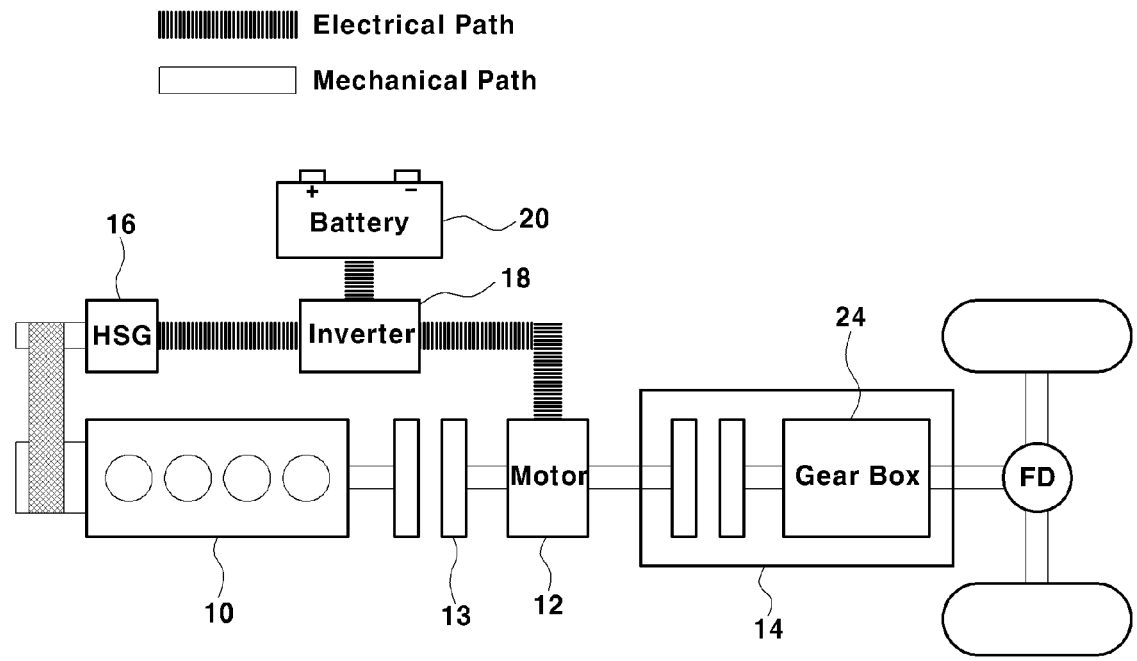
FIG. 1 is a diagram of a power transmission system of a hybrid vehicle according to the related art.
Figure 2:
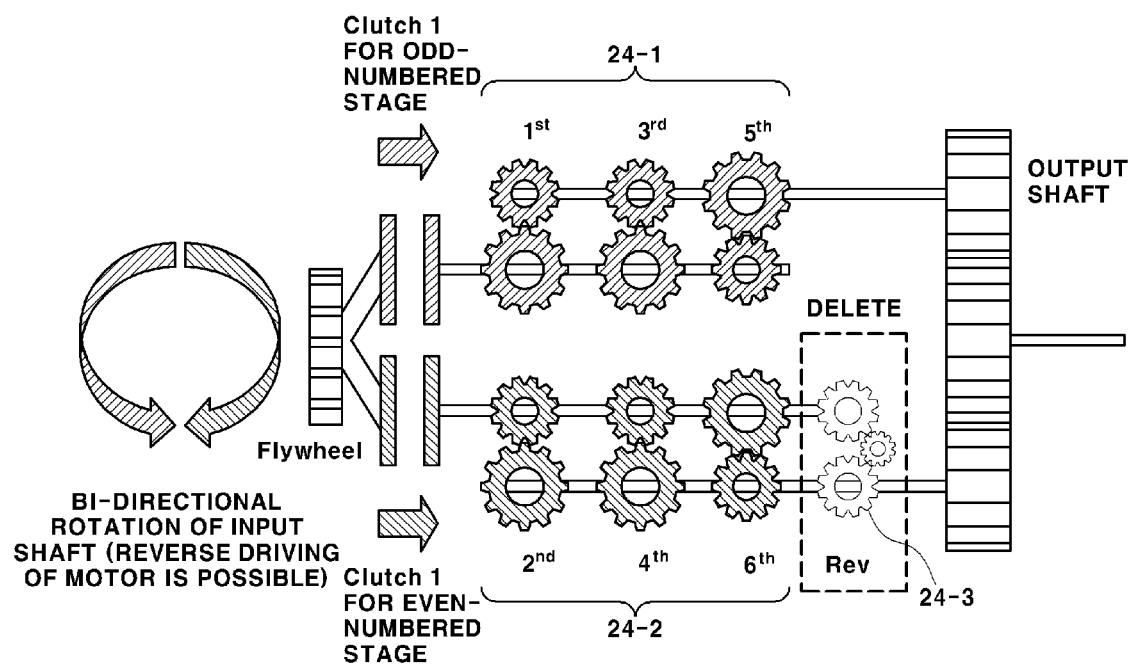
FIG. 2 is a schematic diagram illustrating a configuration of a transmission of a hybrid vehicle according to the related art.

Reference numerals set forth in the Drawings include reference to the following elements as further discussed below:

10: engine
12: motor
13: engine clutch
14: automatic transmission
16: HSG
18: inverter
20: high-voltage battery
22: dual clutch
24: gear box
24-1: first-stage, third-stage, and fifth-stage gear train
24-2: second-stage, fourth-stage, and sixth-stage gear train
24-3: reverse gear train It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other exemplary embodiments, which may be included within the spirit and scope of the invention as defined by the appended claims.

Hereinafter, an exemplary embodiment of the present invention will be described in detail with reference to the accompanying drawings. As described above, a power transfer system for a hybrid vehicle may include an engine 10 and a motor 12 which are disposed in series, an engine clutch 13 disposed between the engine 10 and the motor 12 and configured to transfer or block power of the engine, an automatic transmission 14 configured to shift and output power of the motor or power of the motor and the engine to travelling wheels, a hybrid starter generator (HSG) 16 as a type of motor connected with a crank pulley of the engine and configured to start the engine and generate power of a battery, an inverter 18 configured to operate the motor and adjust power generation, and a high-voltage battery 20 connected with the inverter to be chargeable/dischargeable to provide the motor 12 and the like with power, as illustrated in FIG. 1.

Accordingly, the vehicle may be driven in the EV travelling mode by driving power of the motor 12 when the engine clutch 13 is released (opened), and when the engine clutch 13 is locked (closed), the vehicle may be driven in the HEV travelling mode by driving power of the engine 10 and the motor 12. The present invention focuses on a fact that reverse driving may be performed using the driving power of the motor in the state where a reverse gear train is excluded in the automatic transmission of the hybrid vehicle.

Figure 3:
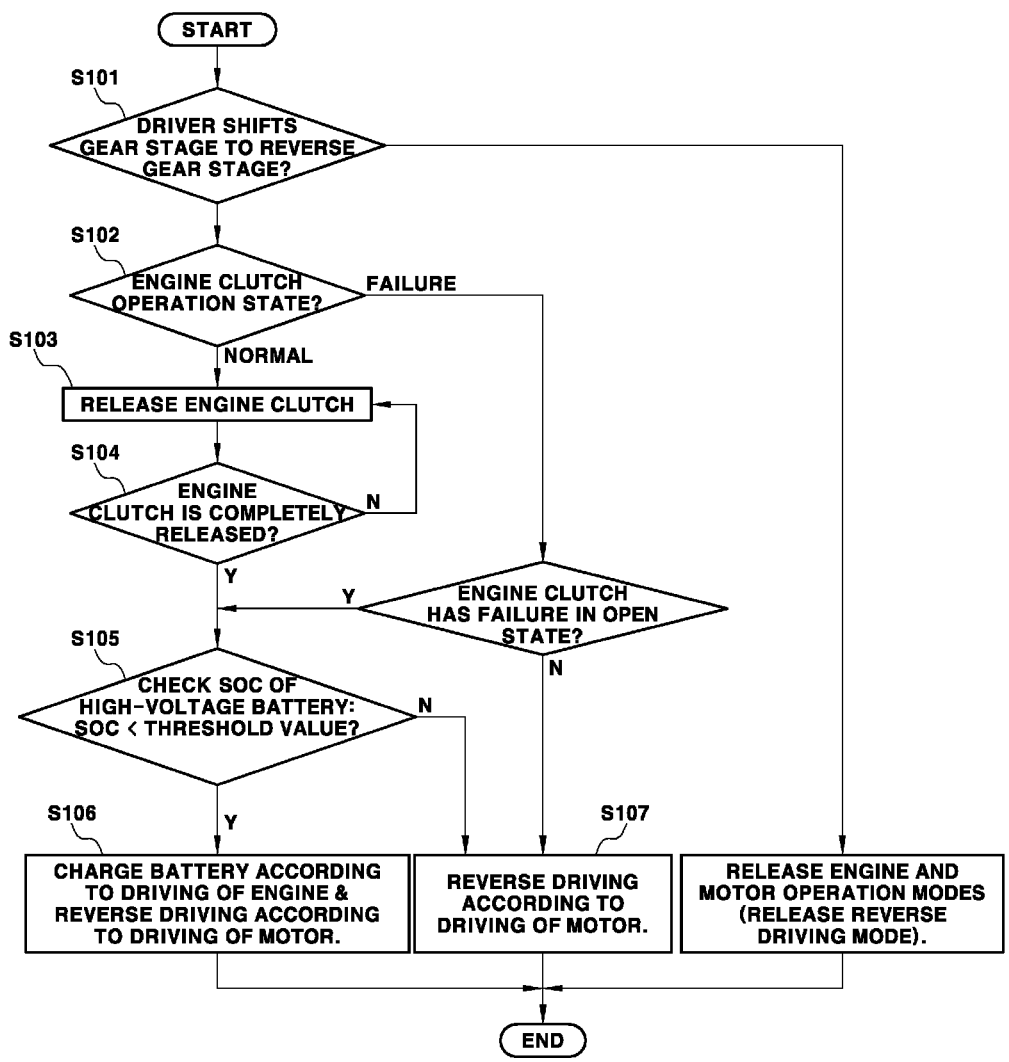
FIG. 3 is a flowchart illustrating a method of controlling reverse driving of a hybrid vehicle according to an exemplary embodiment of the present invention.

FIG. 3 is a flowchart illustrating a method of controlling reverse driving of a hybrid vehicle according to an exemplary embodiment of the present invention. The method described herein below may be executed by a controller having a memory and a processor. In particular, a transmission controller may be configured to determine whether a gear stage enters a reverse gear stage by an operation of a driver (S101). The transmission controller may then be configured to detect an operation state of the engine clutch, that is, whether the engine clutch has a failure or malfunction (S102). For example, the transmission controller may be configured to receive operation state information regarding the engine clutch from an engine clutch controller and detect the received operation state information.

In response to determining that the engine clutch is in a normal operation state (e.g., no malfunction or failure) and then the engine clutch is in a lock-up state, the engine clutch controller may be configured to release the engine clutch. When the engine clutch is in a released state, the engine clutch controller may be configured to maintain the engine clutch release state (S103). For example, when the transmission controller transmits a signal for a reverse gear shift to the engine clutch controller, the engine clutch controller may be configured to release the engine clutch.

Further, the transmission controller may be configured to determine whether the engine clutch is completely released (S104), and when the engine clutch is completely released, the transmission controller may be configured to receive charging state information regarding the high-voltage battery from a battery management system and check the received charging state information (S105). In other words, the transmission controller may be configured to determine whether the high-voltage battery is in a normal level in which a state of charge (SOC) that is a charging quantity state of the high-voltage battery is equal to or greater than a threshold value or in a charging required state in which the SOC is less than the threshold value, based on the battery charging state information received from the battery management system. In other words, the threshold value may be a value that indicates whether the battery requires charging.

In response to determining that the high-voltage battery is in the normal level in which the SOC of the high-voltage battery is equal to or greater than the threshold value, a motor controller may be configured to operate the motor to be driven in a reverse direction. In particularly, when the engine maintains the off state and the engine clutch maintains the release (open) state, only the motor may be driven in the reverse direction (e.g., the reverse direction of a direction of the forward travelling) by the adjustment of the torque of the motor controller, and in this case, the SOC of the high-voltage battery is equal to or greater than the threshold value, and thus, electric energy may be more smoothly supplied to the motor.

Accordingly, the motor may be driven in the reverse direction to more easily reverse the vehicle. In the meantime, in response to determining that the SOC of the high-voltage battery is less than the threshold value as a result of the reception and the check of the charging state information regarding the battery in operation S105, a battery charging control may be executed in the state where the open state of the engine clutch is maintained, and simultaneously, the motor may be driven in the reverse direction (S106).

Similarly, the motor may be driven in the reverse direction to more easily reverse the vehicle. In particular, the battery charging control may be performed by a process of turning on the engine by the engine controller, a process in which the hybrid starter generator connected with a crank shaft of the engine is driven to generate power, and a process of charging the high-voltage battery based on the power generation of the hybrid starter generator.

As described above, even though the motor is driven by the power supplied from the high-voltage battery in the state where the SOC of the high-voltage battery is less than the threshold value, the high-voltage battery may be charged more easily by the power generation of the hybrid starter generator according to the driving of the engine.

In addition, in response to determining that the clutch has a failure in the open state as a result of the failure detection of the engine clutch in operation S102, the method may enter the operation S105 in which the transmission controller may be configured to receive and check the charging state information regarding the high-voltage battery. After the entry to operation S105, in response to determining that the high-voltage battery is in the normal level in which the SOC of the high-voltage battery is equal to or greater than the threshold value, the motor may be operated to be driven in the reverse direction (S107), to thus reverse the vehicle.

Moreover, after the entry to operation S105, in response to determining that the SOC of the high-voltage battery is less than the threshold value, a battery charging control may be performed in the state where the open state of the engine clutch is maintained, and simultaneously, the motor may be operated to be driven in the reverse direction (S106). As a result of the failure detection of the engine clutch in operation S102, in response to determining that the engine clutch has the failure in the close (lock) state or that the engine clutch has the failure in a sleep state, the engine may be operated to maintain an off state to prevent the driving power of the engine from being transmitted to the transmission via the engine clutch, and the motor may be operated to be driven in the reverse direction (S107), to thus reverse the vehicle.

As described above, even in the failure state of the engine clutch, the vehicle may be more easily reversed by the driving power of the motor. Additionally, a vehicle may be reversed more smoothly by a motor even in the state where a separate reverse gear train is not mounted in a gear box of an existing automatic transmission, and particularly, a reverse gear train within a transmission for reverse driving may be eliminated, to thus decrease a size of the transmission and secure a mounting space of a power train including the transmission, thereby providing an advantage in a package aspect.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. A method of controlling reverse driving of a hybrid vehicle, comprising:
   determining, by a transmission controller, when a gear stage enters a reverse gear stage by an operation of a driver;
   detecting, by the transmission controller, whether an engine clutch has a failure or the engine clutch is in a normal operation state;
   in response to detecting that the engine clutch is in the normal operation state, releasing, by an engine clutch controller, the engine clutch;
   detecting a state of charge (SOC) of a high-voltage battery via a battery management system; and
   in response to detecting that the SOC of the high-voltage battery is in a normal level in which the SOC is equal to or greater than a threshold value, operating, by a motor controller, a motor to be driven in a reverse direction.

2. The method of claim 1, wherein the operation of the motor is continued to maintain an engine in an off state and the engine clutch in a release (open) state.

3. The method of claim 1, wherein when the SOC of the high-voltage battery is less than the threshold value, a battery charging control according to the driving of the engine is performed in the state where an open state of the engine clutch is maintained and simultaneously, the motor is operated to be driven in the reverse direction.

4. The method of claim 3, wherein the battery charging control includes:
   turning on, by an engine controller, an engine;
   operating a hybrid starter generator connected to a crank shaft of the engine to generate power; and
   charging a high-voltage battery according to the power generation of the hybrid starter generator.

5. The method of claim 1, wherein in response to detecting that the engine clutch has the failure in an open state, the SOC of the high-voltage battery is detected.

6. The method of claim 5, wherein in response to determining that the SOC state of the high-voltage battery is in the normal level in which the SOC is equal to or greater than the threshold value, a motor is operated to be driven in the reverse direction.

7. The method of claim 5, wherein in response to determining that the SOC of the high-voltage battery is less than the threshold value, a battery charging control according to the driving of an engine is performed in the state where an open state of the engine clutch is maintained and simultaneously, the motor is operated to be driven in the reverse direction.

8. The method of claim 7, wherein the battery charging control includes:
   turning on, by an engine controller, an engine;
   operating a hybrid starter generator connected to a crank shaft of the engine to generate power; and
   charging a high-voltage battery according to the power generation of the hybrid starter generator.

9. The method of claim 1, wherein in response to detecting that the engine clutch has the failure in a close state or that the engine clutch has the failure in a sleep state, the engine is operated to maintain an off state and simultaneously, the motor is operated to be driven in the reverse direction.

10. A system of controlling reverse driving of a hybrid vehicle, comprising:
    a controller having a memory configured to store program instructions and a processor configured to execute the program instructions, the program instructions when executed configured to:
    determine when a gear stage enters a reverse gear stage by an operation of a driver;
    detect whether an engine clutch has a failure or the engine clutch is in a normal operation state;
    in response to detecting that the engine clutch is in the normal operation state, release the engine clutch;
    detect a state of charge (SOC) of a high-voltage battery via a battery management system; and
    in response to detecting that the SOC of the high-voltage battery is in a normal level in which the SOC is equal to or greater than a threshold value, operate a motor to be driven in a reverse direction.

11. The system of claim 10, wherein the operation of the motor is continued to maintain an engine in an off state and the engine clutch in a release (open) state.

12. The system of claim 10, wherein when the SOC of the high-voltage battery is less than the threshold value, a battery charging control according to the driving of the engine is performed in the state where an open state of the engine clutch is maintained and simultaneously, the motor is operated to be driven in the reverse direction.

13. The system of claim 10, wherein in response to detecting that the engine clutch has the failure in an open state, the SOC of the high-voltage battery is detected.

14. The system of claim 13, wherein in response to determining that the SOC state of the high-voltage battery is in the normal level in which the SOC is equal to or greater than the threshold value, a motor is operated to be driven in the reverse direction.

15. The system of claim 13, wherein in response to determining that the SOC of the high-voltage battery is less than the threshold value, a battery charging control according to the driving of an engine is performed in the state where an open state of the engine clutch is maintained and simultaneously, the motor is operated to be driven in the reverse direction.

16. The system of claim 10, wherein in response to detecting that the engine clutch has the failure in a close state or that the engine clutch has the failure in a sleep state, the engine is operated to maintain an off state and simultaneously, the motor is operated to be driven in the reverse direction.

\* \* \* \* \*